United States Patent [19]

Galvin et al.

[11] Patent Number: 4,823,015

[45] Date of Patent: Apr. 18, 1989

[54] ELECTRICAL INTERFERENCE FREE PROJECTED BEAM SMOKE DETECTOR

[75] Inventors: Aaron A. Galvin, Lexington; Douglas L. Mason, Newton Centre; Kenneth J. Leff, Halifax; John N. Schide, Watertown; Ralph A. Giffone, Brighton, all of Mass.

[73] Assignee: ADT, Inc., Parsippany, N.J.

[21] Appl. No.: 239,058

[22] Filed: Sep. 1, 1988

Related U.S. Application Data

[60] Continuation of Ser. No. 37,430, Apr. 13, 1987, abandoned, which is a division of Ser. No. 731,918, May 8, 1985, Pat. No. 4,687,924.

[51] Int. Cl.[4] .......... G01N 21/59; G08B 17/10

[52] U.S. Cl. .......... 250/564; 250/338.1; 250/573; 340/630

[58] Field of Search .......... 250/573, 574, 564, 565, 250/338.1; 340/630; 356/438, 439

[56] References Cited

U.S. PATENT DOCUMENTS

| | | | |
|---|---|---|---|
| 3,316,410 | 4/1967 | Meili et al. | 250/565 |
| 3,711,210 | 1/1973 | Krukowski | 250/565 |
| 3,752,978 | 8/1973 | Kahl, Jr. et al. | 250/340 |
| 3,946,241 | 3/1976 | Malinowski | 250/574 |
| 4,131,888 | 12/1978 | Galvin | 340/630 |
| 4,173,717 | 11/1979 | Lederer | 250/239 |
| 4,215,271 | 7/1980 | Mudge et al. | 250/216 |
| 4,258,360 | 3/1981 | Tagashira | 340/630 |
| 4,420,746 | 12/1983 | Malinowski | 340/630 |
| 4,555,634 | 11/1985 | Muggli et al. | 250/565 |
| 4,649,282 | 3/1987 | Ota et al. | 250/574 |

*Primary Examiner*—Edward P. Westin
*Attorney, Agent, or Firm*—Weingarten, Schurgin, Gagnebin & Hayes

[57] ABSTRACT

A controller including a processor is coupled to a transceiver head pair respectively operative as a transmitter and as a receiver of infrared energy to controllably project a beam of infrared energy therebetween through a projected region. The controller is operative to de-sensitize the beam against potential electrically interfering effects present along the beam path. Plural alarm thresholds are operator selectable to provide enhanced confidence detection, and particularized signal indications are provided to readily and quickly identify possible alarm and trouble conditions.

5 Claims, 9 Drawing Sheets

ELECTRICAL INTERFERENCE FREE PROJECTED BEAM SMOKE DETECTOR

This application is a continuation of application Ser. No. 037,430, filed Apr. 13, 1987, now abandoned, which is a division of Ser. No. 731,918, filed May 8, 1985, now U.S. Pat. No. 4,687,924.

FIELD OF THE INVENTION

This invention is directed to the field of remote indication, and more particularly to a novel self-compensating, self-diagnostic, modular projected-beam smoke detector.

BACKGROUND OF THE INVENTION

Projected beam smoke detectors are typically employed in warehouses, industrial facilities, and other locations having a very large area and/or comparatively high ceilings where a plurality of point-type detectors are unusable or otherwise impractical. Such devices are positively useful where dark-gray, black, and other smoke may be expected to be generated from consumption of material in the projected location, where the flow of conditioned air in the protected space is such that a rapid replacement of refreshed air can be expected, and in general where either large-volume protection or a low-level smoke detection capability is either desirable or important.

Projected beam smoke detectors typically employ a diverging beam of infrared energy that is projected from an infrared transmitter through a region to be protected and onto a spaced confronting infrared receiver. The intensity of the transmitted energy is attenuated in dependence upon the density and quality of smoke present along the optical path between the transmitter and the receiver. The receiver includes circuitry operative in response to the intensity of the received infrared energy to signal an alarm condition whenever it is out of prescribed bounds.

The receiver is usually mounted at the same height as and along the optical axis of the transmitter both to insure the reception of the transmitted energy and to prevent those false-alarms and failure-of-alarm situations that arise from mis-aligned optics. In the usual case, the receiver and the transmitter are installed to secure, torsion-free supports with the transmitting and receiving elements roughly in alignment, and thereafter the light emitting and light receiving elements themselves are vertically and/or horizontally so displaced as to bring them into precise co-axial alignment.

For some application-environments, appropriate pre-existing confronting supports such as spaced walls in the region to be protected are unavailable so that one or more costly transmitter and/or receiver mounting posts must be severally provided therefor. Moreover, as the supports naturally settle and/or are rotated by mechanical building stresses the transmitting and receiving elements mounted thereto tend to optically mis-align. If unnoticed, the undesirable possibility then arises of either a failure-of-protection situation or a false-alarm situation. Often the movement is of such a magnitude as to be beyond the range of compensation of the horizontal and vertical optical element adjustment capability, necessitating a further costly and time-consuming re-mounting and re-alignment procedure.

The transmitter and receiving heads are commonly employed in application-environments subject to undesirable electrical interferences that may give rise to failure and false alarm situations. One particularly troublesome interference is produced by fluorescent lighting such as would be present in a warehouse to be protected. In such cases and in dependence on the sense of the interferring fluorescent effects the receiver electronics are subject to degraded performance that could unduly delay its detection of a possible alarm event and thereby allow an undesirable increase in the degree of fire and/or smoke damage.

Projected beam smoke detectors are commonly installed in the protected region and calibrated while the region is being used in its normal everyday manner. In many applications such as for industrial facilities the calibration is performed relative to the changing ambient pollution levels generated in the working environment. If the projected-beam smoke detector is installed during uncharacteristically low-levels of pollution, it will then operate to produce unnecessary false alarms. If installed during uncharacteristically high-levels of work space pollution, it will operate to produce a failure-of-alarm situation. If the smoke detector is installed and calibrated at "nominal" working levels, the ambient characteristics of the work space environment still would vary in accordance with the type of activities being performed and thereby still give rise to the possibility of failure and false alarm situations.

After long periods of use in polluted environments, a film of dirt, dust, and grime builds-up on the transmitting and receiving elements even when mounted in well-sealed enclosures. The film provides an occlusion in the optical path that effectively acts to sensitize the detection capability of the beam smoke detector. In particularly polluted work spaces such as encountered in some manufacturing facilities, the degree of obscuration can be such as to repetitively produce an annoying false alarm signal indication so that a costly and burdensome periodic checking by maintenance personnel of the state of the optical elements is often employed to circumvent such a possibility.

SUMMARY OF THE INVENTION

The projected-beam smoke detector according to the present invention includes a modular transceiver head that includes an infrared transparent and visibly opaque cover portion that is fastened in air-tight sealing relation with an elongated base portion. The transceiver heads are operable either as a transmitter or as a receiver of infrared energy simply by selecting an appropriate snap-releasable printed circuit board that is slidably received in the base member. The optical cover member of the modular transceiver includes three optical windows defined approximately at right-angles to each other that together subtend 180° of azimuth and at least 60° of elevation. The transceiver head includes an optical train having a stationary optically-active element, a stationary focusing lens, and an adjustable specular member controllably moveable in a rough adjustment mode to deviate optical energy through 180° of azimuth and in a fine-adjustment mode to deviate optical energy through fine angles of arc defined within 180° of azimuth and 60° of elevation. The transceiver head of the present invention thereby makes possible a quick and accurate beam alignment that readily accomodates settling and rotation of structural members upon which they are mounted with such a range of compensation as to insure ease of re-alignment even for severe settling and torsion-induced rotations.

A controller including a processor is connected to a pair of transceiver heads that are respectively operative as a transmitter of infrared energy and as a receiver of infrared energy. The processor is operative to repetitively pulse the transmitter with a pulse train having a period that defines a frequency that is spectrally offset from the frequency of potentially interfering phenomena. The present invention therewith eliminates the possibility of failure and/or false alarms arising for example from fluorescent lighting interference.

The receiver under processor control is repetitively operative to synchronously detect each of the pulses of the transmitted pulse train and to provide a digital representation of the intensity thereof. In response to the intensity falling below any one of several operator-selectable first alarm levels and in response to the intensity falling below any one of several second operator-selectable lower alarm levels the processor is operative to provide first and second alarm signal indications. The dual-threshold levels and differentiated alarm outputs cooperate to help eliminate false smoke detection.

The processor is operative to maintain data representative of a running average of the intensity of the received optical energy. After preselected time-intervals, the processor is repetitively operative to compare the data to preselected gain data in memory. In dependence on the sense of any detected change therebetween, the processor is operative to adapt the intensity of the signal representative of the received signal energy to compensate the decision process both for changing ambient conditions in the protected space and for film build-up on and along the optical train of the transceiver heads. The projected-beam smoke detector of the present invention thereby substantially eliminates failure and false alarm situations such as would arise by soiling of the optical elements during long-term usage in dirty environments as well as for changing atmospheric conditions in the particular applications environment.

The preselected gain data remains the same irrespective of the level of the received energy so that the decision process maintains the same detection sensitivity irrespective of the absolute level of the received energy. Therewith, the present invention achieves a very high degree of noise immunity.

After preselected time intervals, the processor is repetitively operative to reduce the period of the transmitted pulse train for self-testing. The shortened pulses produce a corresponding reduction in the intensity of the received signal energy. The processor is operative to compare the reduced levels to preselected but lower alarm thresholds provided therefor to simulate an alarm condition. The projected-beam smoke detector of the present invention thereby substantially reduces for example the possibility of mis-aligned optical components and other such sources of possible system malfunctions from remaining undetected and occasioning false and failure-of-alarm situations.

The processor is further operative to successively strobe an external hard-wired watchdog timer. The timer is responsive to a failure of the processor to produce the strobe pulses to indicate a trouble signal representative of possible processor malfunction, and a circuit fail LED is illuminated.

The processor is further operative to provide individual signal indications of various system operating conditions that aid in maintenance and trouble-shooting. A trouble LED is controllably lit to represent one or more of a blocked beam condition, a microprocessor failure condition, a self-test failure condition, and a minimum gain condition. An alarm one LED, an alarm two LED, and a clean LED are controllably lit in response to the exceedance of the first and second operator-selectable alarm thresholds and to dirt, dust, and/or grime build-up, respectively.

BRIEF DESCRIPTION OF THE DRAWINGS

These and other features and advantages of the present invention will become apparent as the invention becomes better understood by referring to the following solely-exemplary and non-limiting detailed description of a preferred embodiment thereof, and to the drawings, wherein.

DETAILED DESCRIPTION OF THE PREFERRED EMBODIMENT

Figure 1:
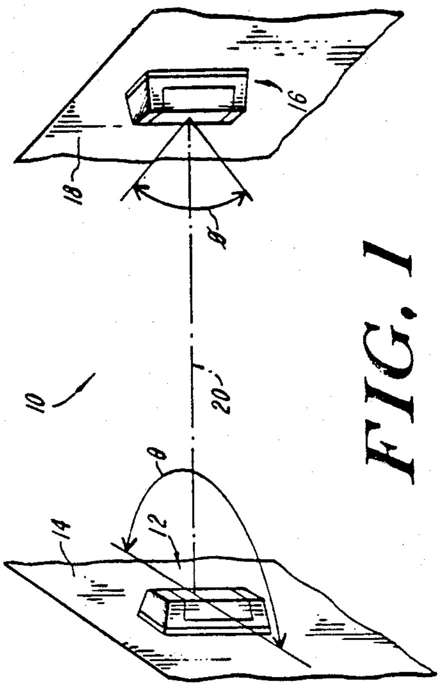
FIG. 1 is a pictorial view illustrating an exemplary application where the self-compensating, self-diagnostic, modular projected-beam smoke detector of the instant invention has exemplary utility.

Referring now to FIG. 1, generally designated at 10 is a pictorial system diagram of an exemplary application where the self-compensating, self-diagnostic, modular projected-beam smoke detector according to the present invention has exemplary utility. The system 10 includes a transceiver generally designated 12 mounted to a support 14 that preferably is stationary and neither subject to stress-induced torsion nor to undesirable settling. A transceiver generally designated 16 is mounted to a similar support 18 in spaced relation to the transceiver 12. As illustrated, the transceiver 12 is operative as a transmitter of infrared energy and the transceiver 16 is operative as a receiver of the transmitted infrared energy.

An optical axis illustrated in dot/dash line 20 is defined between optically active elements to be described of the transceivers that subtends a field of view substantially over 180° of azimuth as designated by an angle Theta and over 60° of elevation as designated by an angle Phi. It will readily be appreciated that the wide-angle field-of-view in most cases allows transceiver mounting to pre-existing supports already in the region to be protected and in such a way as to usually avoid the necessity for providing special support structures therefor to provide an intended spacial coverage.

Figure 2:
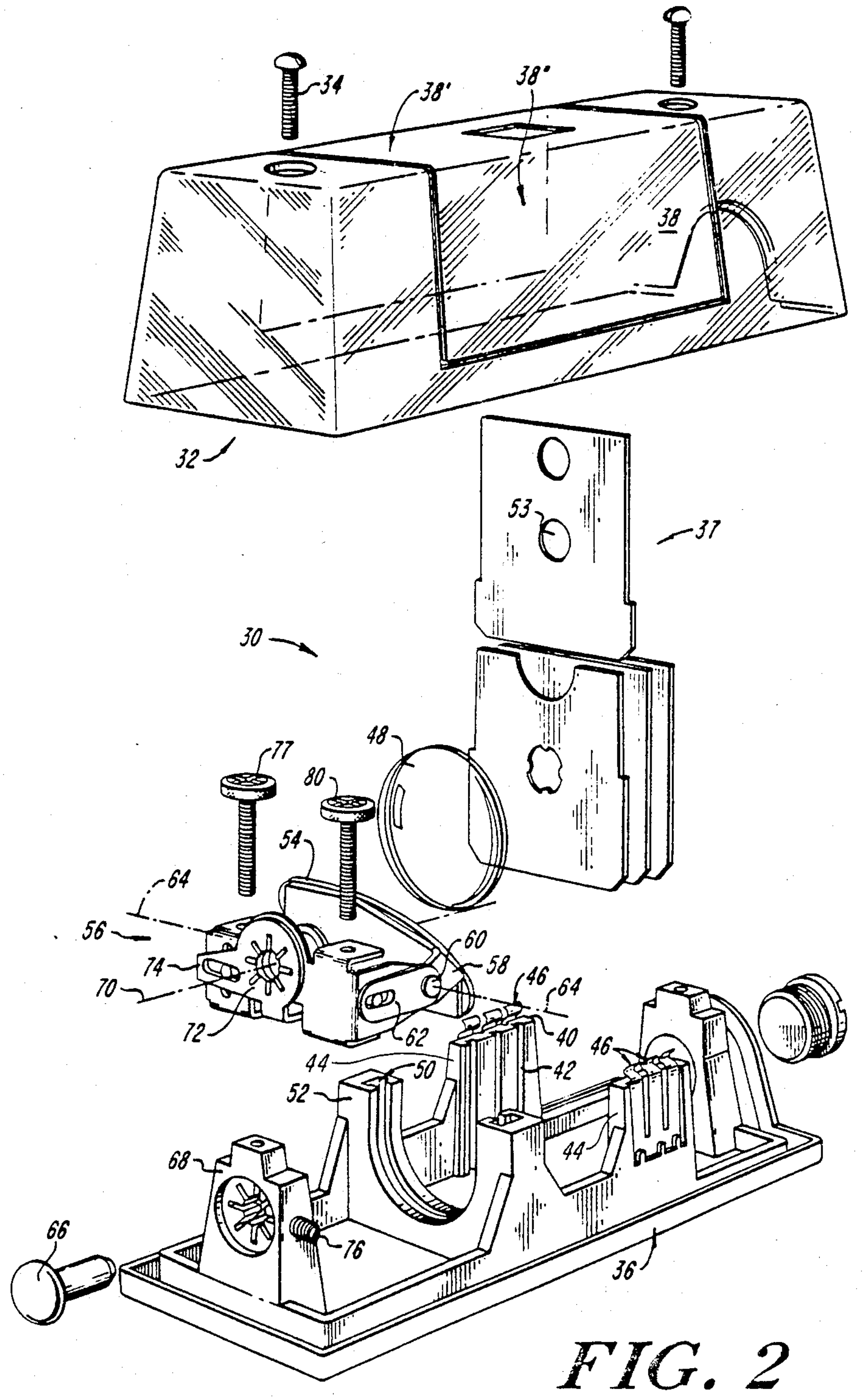
FIG. 2 is an exploded perspective view illustrating a transceiver head of the self-compensating, self-diagnostic, modular projected-beam smoke detector according to the present invention.

Referring now to FIG. 2, generally designated at 30 is an exploded perspective view of a transceiver of the self-compensating, self-diagnostic, modular projected-beam smoke detector according to the present invention. The transceiver 30 includes an infrared transparent and visibly opaque cover member generally designated 32 that is fastened as by threaded fasteners 34 in air-tight sealing relation with an elongated base member generally designated 36. The housing cover member 32 is preferably fabricated to LEXAN and defines three optical windows, generally designated 38, 38', 38" located approximately at right angles to each other. Laterally confronting windows 38, 38" together with the included window 38' accomodate the 180° azimuthal field-of-view of the optical axis of the transceivers 12, 16 (FIG. 1) and the longitudinal extension of the windows accomodates the 60° elevational field-of-view thereof.

The optical elements and the transceiver electronics are preferably mounted to the base member 36 of the transceiver 30. Printed circuit boards generally designated 37 are slidably mounted in corresponding confronting slots provided therefor in upstanding laterally spaced side walls 40 integrally formed with the base member 36. The printed circuit boards 37 are removeably retained in corresponding ones of the confronting slots 42 by spring-clips 46 mounted to the side walls 44 that releaseably engage the top edges of the printed circuit boards 37. It will be appreciated that the transceiver 30 is operative either as a transmitter or as a receiver of infrared energy in dependence on whether either a transmitter card or a receiver card both to be described are slidably mounted into the base 36. The transceivers 30 are otherwise substantially identical for operation either as a transmitter or as a receiver.

A lens 48 is slidably mounted in an arcuate groove generally designated 50 provided therefor in a transverse wall 52 integrally formed with the base member 36. The lens 48 may advantageously be formed of any suitable plastic material. One of the cards 37 has an optically active element that is either a source or a receiver of infrared energy corresponding to operation as a transmitter or as a receiver. The lens 48 and the corresponding one of the cards 37 having the optically active element are mounted to the base member 36 with the active element located at the focal point of the lens 48. The cards 37 have apertures generally designated 53 therethrough that allow infrared energy present along the optical axis of the transceiver to be imaged by the lens 48 with the corresponding active element.

A specular member 54 is mounted by a gimbal assembly generally designated 56 to be described for controlled movement relative to the base 36. The specular member 54 is preferably constituted as a silvered totally reflecting mirror. The assembly 56 provides both rough and fine alignment adjustment of the pointing direction of the element 54 such that the optically active elements of an associated transmitter and receiver pair can be quickly and accurately aligned along the 180° of azimuth and along the 60° of elevation that provide the field-of-view of the optical axis of the transmitting and receiving transceivers.

Figure 3:
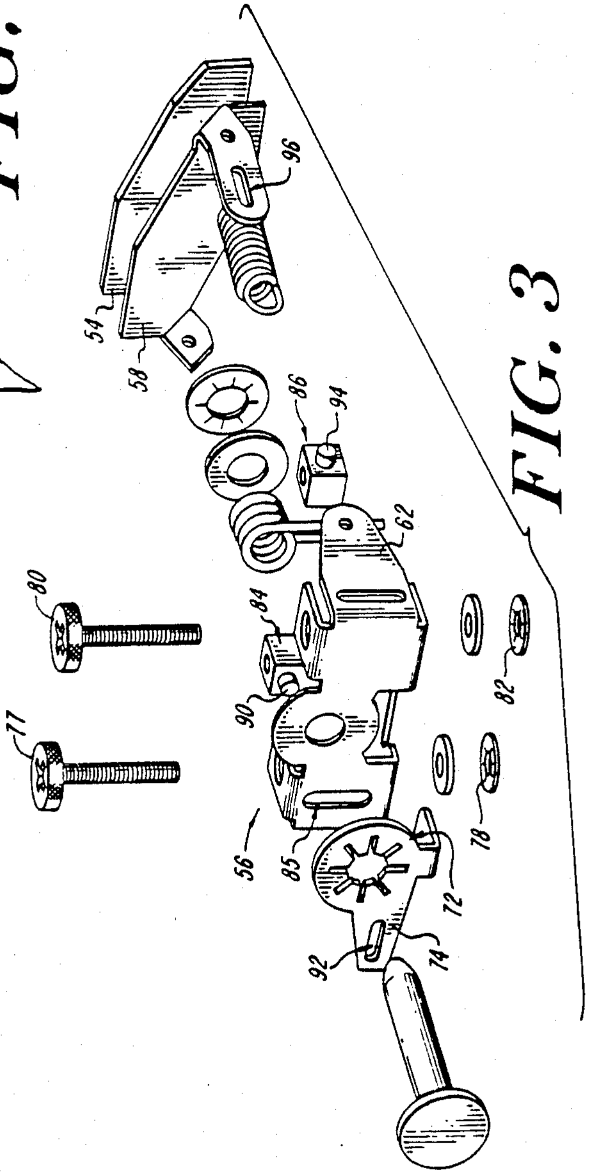
FIG. 3 is an exploded perspective view illustrating the moveable specular member of the transceiver head of the self-compensating, self-diagnostic, modular projected-beam smoke detector according to the present invention.
Figure 6:
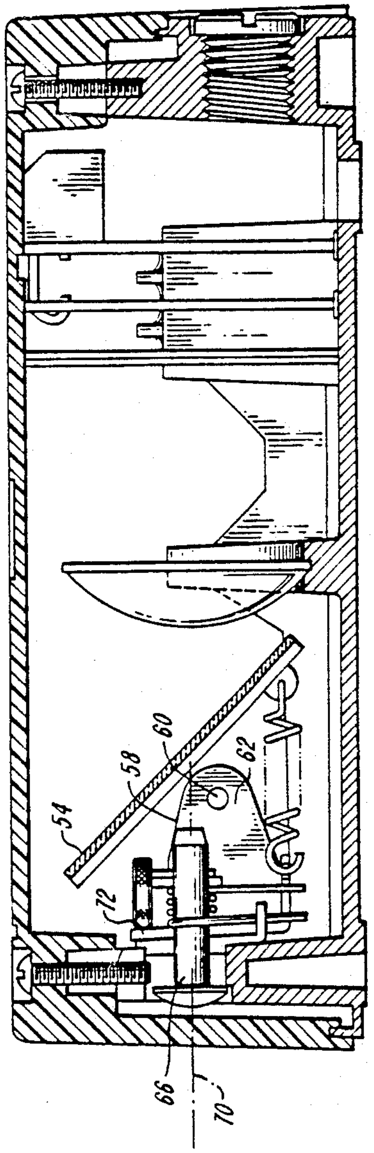
FIG. 6 is a sectional view along the lines 6—6 of FIG. 5.

Referring now to FIGS. 2, 3, and 6, the mirror 54 is adhesively fastened to a yoked mirror support member 58 that is rotatably mounted as by rivets 60 to a yoked member 62 for pivoting motion about an axis 64. The yoked mounting member 62 is mounted for rotation about an axis 70 orthogonal to the axis 64 on a shaft 66 that is mounted for rotation in a journaled aperture provided therefor through an upstanding post 68 integrally formed with the base member 36.

Figure 5:
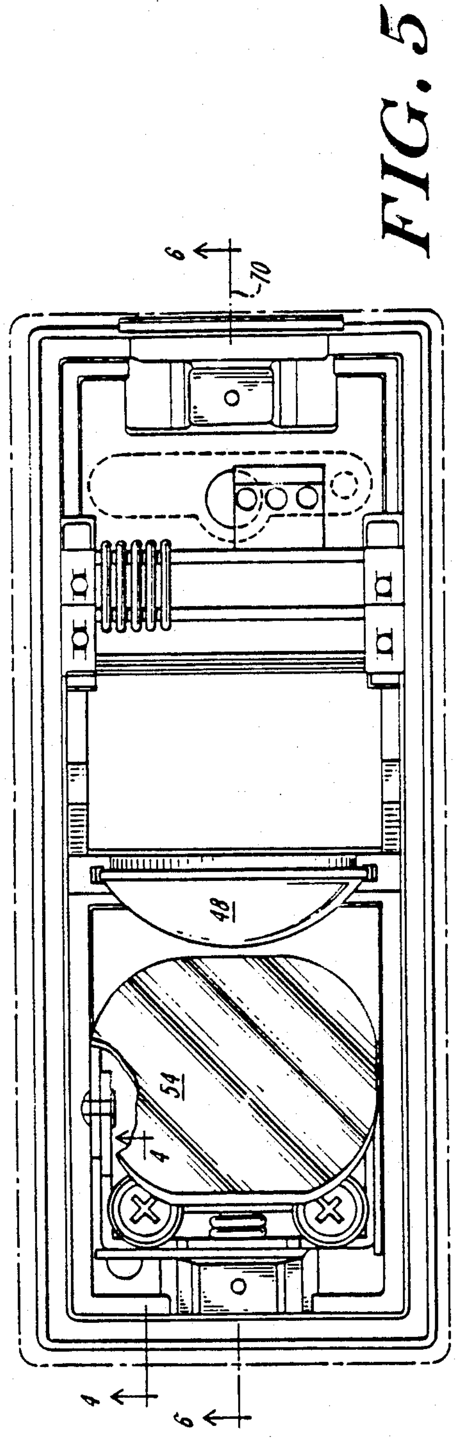
FIG. 5 is a top plan view illustrating the transceiver head of the self-compensating, self-diagnostic, modular projected-beam smoke detector according to the present invention.

A locking ring 72 is mounted for rotation with the shaft 66 and has an extending arm 74 confronting the interior surface of the upstanding post 68. It will be appreciated that the yoked member 62 is easily grippable between the thumb and fingers of a hand and controllably rotated about the axis 70 to roughly orient the pointing direction of the mirror 54 at a selected azimuthal angle. A threaded bolt 76 is provided through the post 68 to lock the shaft 66 and therewith the mirror 54 in an intended orientation. For the position illustrated in FIG. 5, the specular member 54 is pointing upwardly out of the plane of the paper so that the rotation of the mirror 54 about the axis 70 in a clockwise manner will orient its pointing direction of the mirror to figure right, while the rotation of the mirror 54 about the axis 70 in a counterclockwise manner will orient its pointing direction to figure left, both not specifically illustrated.

Referring now to FIGS. 2 and 3, a threaded bolt 77 is slidably inserted through apertures provided therefor in the yoked member 62 and rotatably mounted thereto by lock nuts 78, and a threaded bolt 80 is slidably inserted through apertures provided therefor in the yoked member 62 and rotatably mounted thereto by lock nuts 82. A slide 84 is threaded on the bolt 77 and a slide 86 is threaded on the bolt 80. The slide 84 has an extending post 90 that is received through an orthogonal slot provided therefor in the yoked member 62 and terminates in a slot generally designated 92 in the arm 74 of the member 72. The slide 86 has an extending post 94 that extends through another slot provided therefor in the yoked member 62 and terminates in a slot generally designated 96 provided therefor on one of the legs of the yoked mirror support member 58.

Figure 4:
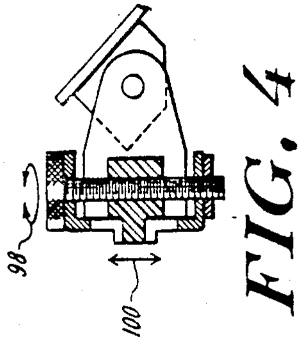
FIG. 4 is a sectional view along the lines 4—4 of FIG. 5.

As can best be seen in FIG. 4, controlled rotation of either the threaded shaft 77 or the threaded shaft 80 as illustrated by an arrow 98 results in a corresponding linear motion of the post 90 or the post 94 as illustrated by an arrow 100. The controlled rotation of the threaded shaft 77 linearly moves the post 90 of the slide 84, which gangs the walls defining the slot 92 of the arm 74 and rotates the mirror 54 by the corresponding arc about the axis 70 for providing fine-tuning of the azimuthal pointing direction thereof. In a similar manner, controlled rotation of the threaded shaft 80 effects the linear motion of the post 94 on the slide 86 which gangs the walls defining the slot 96 of the mirror support member 58 and therewith provides fine-tuning of the elevational pointing direction of the mirror 54.

Figure 7:
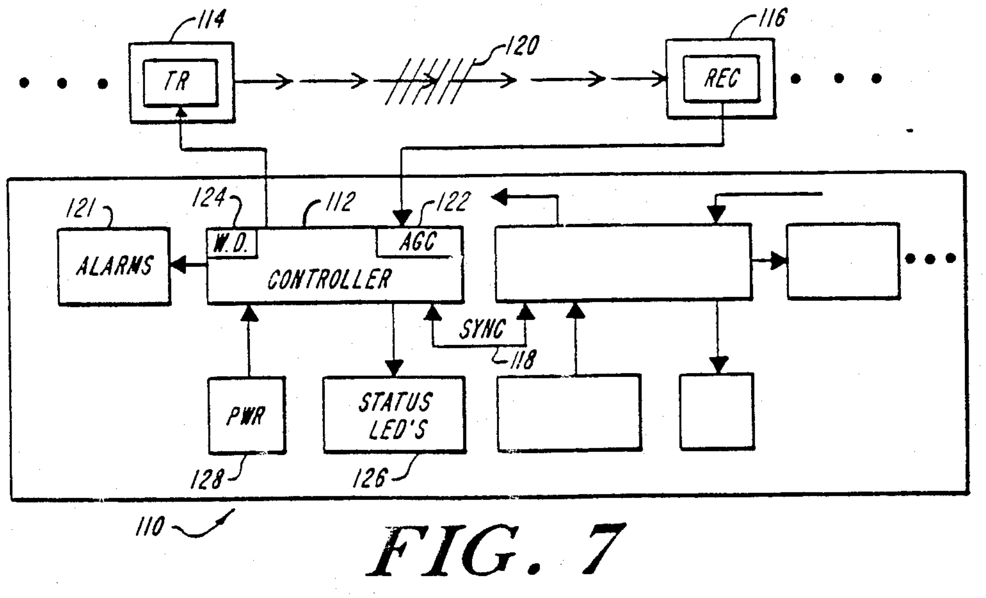
FIG. 7 is a block diagram illustrating the self-compensating, self-diagnostic, modular projected-beam smoke detector according to the present invention.

Referring now to FIG. 7, generally designated at 110 is a block diagram illustrating the self-compensating, self-diagnostic, modular projected-beam smoke detector according to the present invention. The system 110 includes a controller 112 to be described operatively connected to an infrared transmitter 114 and to an infrared receiver 116, both to be described. Several controllers 112 may be employed that are each associated with a corresponding transmitter and receiver pair, not shown. The several controllers are preferably sequentially operative so that when one controller is in operation the other controllers are in a waiting state, as shown by a double headed arrow 118 designated "sync". The sequential operation of the several controllers 112 is preferably accomplished by designating one of the controllers as a master, with the other controllers slaved thereto. A DIP switch to be described can with advantage be employed for operator selection of the particular controllers to serve as master and slaves.

The controller 112 is operative in a manner to be described to control the transmitter 114 to transmit infrared pulses with a preselected period selected to define a frequency that is offset from the frequency of unwanted interference schematically illustrated by diagonal lines 120 present in the region to be protected.

The receiver 116 is responsive to the received pulses, but not to the interferring phenomena 120, to provide an electrical signal to the controller that is only representative of the intensity of the received pulses of infrared energy. The controller 112 is operative in response to the magnitude of the signal representative of the received infrared energy to actuate suitable alarms 121 to be described when the magnitude thereof falls below first and second operator-selectable thresholds to be described.

The controller 112 is periodically operative to reduce the duration of the transmitted pulses. In response to the correspondingly decreased received energy intensity, the controller is operative to provide a self-diagnostic test of its own operation to be described.

The controller 112 includes an automatic gain control circuit 122 designated "AGC" to be described operative to periodically compensate the smoke alarm decision process to adapt to changing ambient atmospheric conditions as well as to adapt for such long-term effects as film build-up on the optical elements of the transceivers. It should be noted that the circuit 122 in a similar manner is operative to compensate for changing temperature effects as well.

The controller includes a self-testing watch-dog timer circuit 124 designated "W.D." to be described responsive to a strobe signal produced by the controller 112 to provide an indication that the controller 112 is itself operating in its intended manner.

A plurality of status LED's 126 to be described are controllably actuated to provide such self-diagnostic signal indications as a blocked beam condition, a minimum automatic gain control condition, a failure of the processor to strobe condition, and a failure of self-test condition.

A power source 128 designated "PWR" is operatively coupled to the controller 112 for supplying its electrical power requirements.

Figure 8:
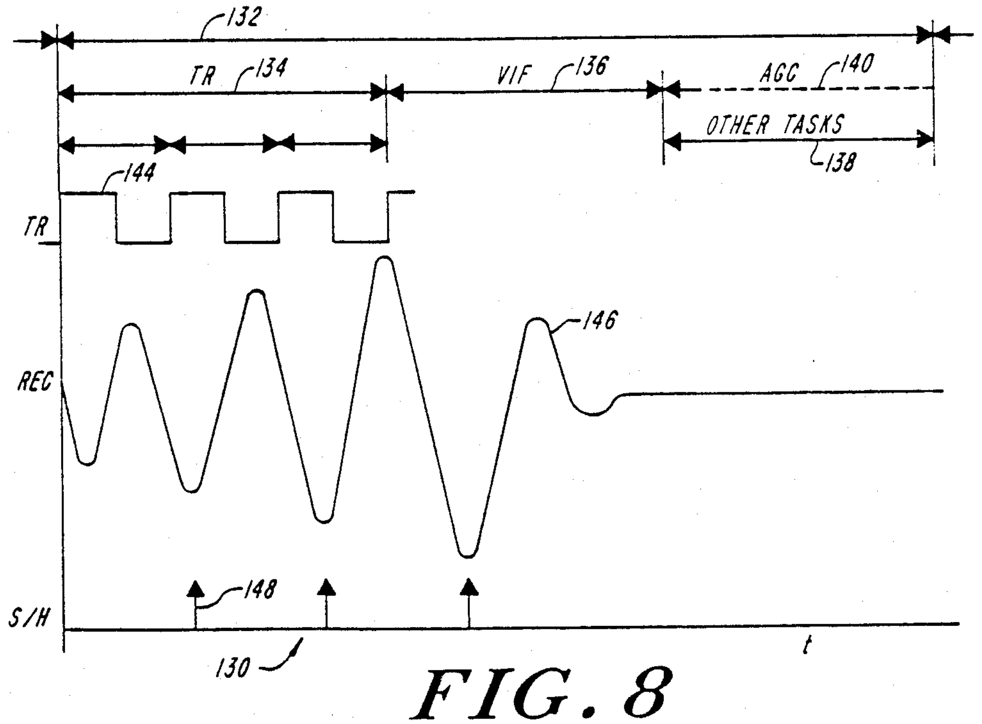
FIG. 8 is a timing diagram useful in illustrating the operation of the self-compensating, self-diagnostic, modular projected-beam smoke detector according to the present invention.

Referring now to FIG. 8, generally designated at 130 is a timing diagram useful in illustrating the operation of the self-compensating, self-diagnostic, modular projected-beam smoke detector according to the present invention. A double headed arrow 132 defines an interval that represents a basic cycle of operation that the detector repeats time sequentially for the duration of operation of the detector. Each cycle 132 includes a transmit window 134 designated "TR" of fixed duration, a tally receive counts window 136 designated "V/F" of fixed duration, and an other tasks window 138 designated "OTHER TASKS" of fixed duration in which is included a variable-length automatic gain control window 140 designated "AGC".

The interval defined by the transmit window 134 is divided into three temporally adjacent sub-windows illustrated by double-headed arrows 142. Preferably, the transmit window 134 defines a one millisecond interval, and the sub-windows 142 each define a three hundred thirty-three and a third ($333\frac{1}{3}$) microsecond interval. The record/receive counts window 136 preferably defines a five millisecond interval, and the other tasks window 138 preferably defines a six millisecond interval. The variable-length automatic gain control window 140 preferably defines an interval between one thousand and five thousand microseconds. The basic cycle of operation 132 thus defines a twelve millisecond interval and a repetition frequency of eighty three and a third hertz.

The controller is operative during the transmit window 134 of successive basic cycles 132 to repetitively pulse the transceiver operative as a transmitter to emit three one hundred and sixty six microsecond pulses 144 at the beginning of each of the sub-windows 142 so that the transmitter is repetitively "on" for one hundred and sixty six microseconds and "off" for one hundred and sixty six microseconds during each of the three sub-windows 142. It has been found that interference from fluorescent lighting has a spectrum having a significant component near the one kilohertz line. Since the period of the sub-windows define a three kilohertz transmission frequency the reception of the transmitted energy is substantially free from undesirable fluorescent lighting interference centered at the one kilohertz frequency.

After the transmission of the one hundred and sixty six microsecond pulses in each sub-window 142, the controller waits a predetermined time designated "D" to allow the received signal energy designated 146 to be received. After each such delay for the several sub-windows 142, the controller produces a sample pulse designated by upstanding arrows 148 that are timed to detect the received energy 146 synchronously at the peaks of the received energy. The sample and hold pulses 148 preferably define a one hundred microsecond interval, not specifically illustrated.

During each of the record/receive counts windows 136, the controller is responsive to the intensity of the received energy to produce a digital representation thereof. As described below, the intensity of the received energy is preferably converted to a voltage level, which in turn is preferably converted into a pulse train having a frequency that corresponds to the magnitude of the voltage level. The number of pulses at the corresponding frequency are counted during the fixed duration of the window 136 in such a way as to produce data that uniquely corresponds to the intensity of the received energy.

In the other tasks window 138, the controller compares the digital representation of the intensity of the received energy to plural operator-selectable threshold levels to be described and actuates suitable signal indications indicative of smoke detection where appropriate. During the other tasks window 138, the controller is further operative to maintain data representing a running time average of the intensity of the received signal energy. The average data is compared to preselected gain data in system memory and the decision process is compensated for transceiver optical element occlusion as well as for changing ambient atmospheric characteristics of the region to be protected. Preferably, the compensation is effected by varying the length of the variable interval of the automatic gain control window 140 in such a way as to either increase or to decrease the frequency of the pulse train that corresponds to the intensity of the received energy. By compensating the signal representative of the received energy, the present invention makes possible the same detection sensitivity even for severably degraded and low-levels of received energy.

Figure 9:
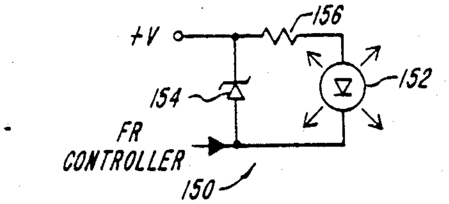
FIG. 9 is a schematic circuit diagram of the transmitter of the self-compensating, self-diagnostic, modular projected-beam smoke detector according to the present invention.

Referring now to FIG. 9, generally designated 150 is a schematic diagram of a preferred embodiment of the electronics of the transmitter of the present invention. The transmitter 150 includes an infrared emitting diode (IRED) 152 connected in parallel to a voltage-limiting diode 154 via a series resistor 156. A source of potential designated "+V" and a current signal from the controller to be described that controllably actuates the infrared light emitting diode 152 to provide transmitted energy at the three kilohertz line are connected at respective ends of the Zener diode 154. The transmitter 150 preferably is fabricated by well-known techniques on a printed circuit board, which is slidably received in a corresponding transceiver with its light emitting diode located at the focal point of the lens and aligned with the specular member through corresponding ones of the apertures provided therefor in the PC cards along the optical axis of the transceiver heads.

Figure 10:
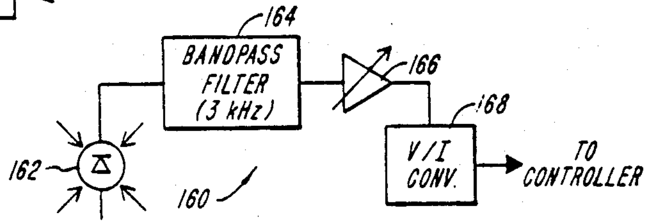
FIG. 10 is a schematic block diagram illustrating the receiver of the self-compensating, self-diagnostic, modular projected-beam smoke detector according to the present invention.

Referring now to FIG. 10, generally designated at 160 is a schematic diagram of the electronics of the receiver in preferred embodiment. The receiver 160 includes a photodiode 162 responsive to the intensity of the received infrared energy to provide an electrical signal representative thereof. A band pass filter 164 having a three kilohertz center frequency is responsive to the electrical signal representative of the intensity of the transmitted beam to provide a filtered electrical signal having minimal spectral interference components produced by fluorescent lights. A variable gain amplifier 166 produces an amplified electrical signal whose voltage represents the intensity of the received and filtered infrared energy. A voltage to current converter 168 is operative in response to the voltage signal to convert it into a current signal proportional thereto that is transmitted to the controller 112 (FIG. 7) preferably via a cable, not specifically illustrated. The conversion of the voltage into a current signal representative thereof allows the transmission of the received signal along the cable without significant loss of signal strength. The receiver 160 likewise is preferably fabricated in well-known manner on a printed circuit board that is slidably received at the focal point of the lens and in optical communication with the specular member through the apertures provided therefor along the optical axis of the transceiver heads.

Figure 11A:
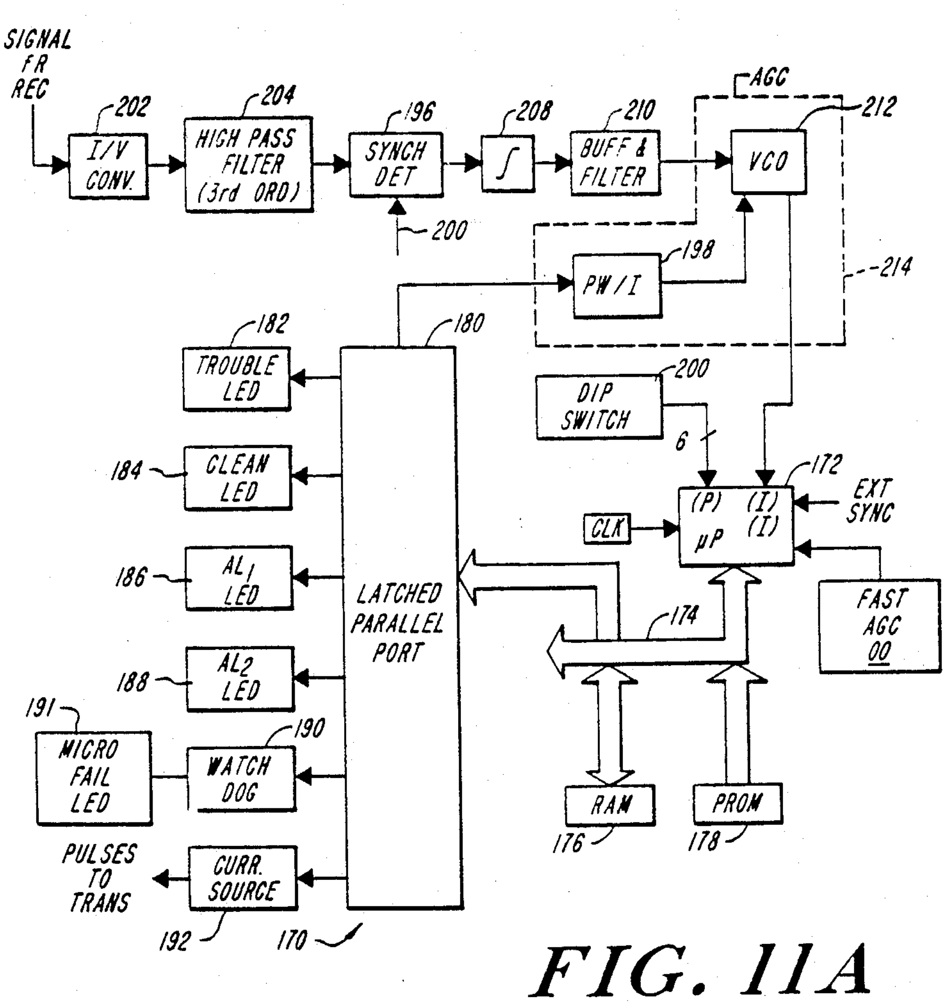
FIG. 11A is a block circuit diagram illustrating the self-compensating, self-diagnostic, modular projected-beam smoke detector according to the present invention.

Referring now to FIG. 11A, generally designated at 170 is a schematic diagram illustrating the controller of the self-compensating, self-diagnostic, modular projected-beam smoke detector according to the present invention. The controller 170 includes a microprocessor 172, preferably an Intel 80C31, having a single multiplexed address and data bus 174. Internal RAM 176 and external PROM 178 are associated therewith in the usual manner. A memory-mapped latched parallel port peripheral 180 is operatively coupled to the processor 172 via the multiplexed address and data bus 174. The processor 172 is operative to select any one of the ports of the latched parallel port 180 and to control an output device associated therewith by writing the corresponding port address and control data thereto over the multiplexed address and data bus 174 in well known manner. It will be appreciated that although memory-mapped peripheral control is preferred, other addressing techniques such as address decoding can be employed without departing from the inventive concept.

A trouble LED 182 is connected to one port of the latched parallel port 180. A clean LED is connected to another port of the latched parallel port 180. A first alarm LED 186 is connected to a further port of the latched parallel port 180. A second alarm LED 188 is connected to another port of the latched parallel port 180. A watch-dog timer 190 is connected to a further port of the latched parallel port 180, and a micro-fail LED 191 is operatively connected to the timer 190. A current source 192 is connected to a further port of the latched parallel port 180. A synchronous detector 196 is connected to another port of the latched parallel port 180. A pulse width to current converter 198 designated "PW/I" is connected to a further port of the latched parallel port 180.

A DIP switch 200 is connected over six lines to an I/O port of the microprocessor 172. The DIP switch 200 is a six-position switch that allows the system operator to select a particular one of a plurality of first alarm levels, and to select a particular one of a plurality of second alarm levels. The first and second alarm levels are selected in dependence upon the characteristics of the corresponding applications environment. The alarm one threshold values are selected by the first three switch positions of the DIP switch 200. Although various levels may be set, it is preferred that the alarm one levels be selected according to the following table.

| ALARM ONE | | | |
|---|---|---|---|
| | DIP SWITCH SETTING | | |
| OBSCURATION | 1 | 2 | 3 |
| 7% | OFF | OFF | OFF |
| 10% | OFF | OFF | ON |
| 13% | OFF | ON | OFF |
| 16% | OFF | ON | ON |
| 20% | ON | OFF | OFF |
| 30% | ON | OFF | ON |
| 40% | ON | ON | OFF |
| 50% | ON | ON | ON |

The alarm two levels are preferably selected to be greater than corresponding ones of the alarm one levels so that an indication of a progressive build-up of smoke present along the beam path will first be indicated by a crossing of the first alarm level and then by a crossing of the second alarm in turn. The alarm two levels are selected by the system operator by the fourth switch position of the six position DIP switch 200, and preferably according to the following table, although other suitable values can likewise be employed.

| ALARM TWO A | |
|---|---|
| | DIP SWITCH SETTING |
| % OBSCURATION | 4 |
| 10.5 | ON |
| 15 | ON |
| 19.5 | ON |
| 24 | ON |
| 30 | ON |
| 45 | ON |
| 60 | ON |
| 75 | ON |

| ALARM TWO B | |
|---|---|
| | DIP SWITCH SETTING |
| % OBSCURATION | 4 |
| 14 | OFF |
| 20 | OFF |
| 26 | OFF |
| 32 | OFF |
| 40 | OFF |
| 60 | OFF |
| 80 | OFF |
| 100 | OFF |

The alarm two thresholds are selectable to provide a high-sensitivity condition (A) when the DIP switch four position setting is "ON" and a low-sensitivity condition (B) when the DIP switch four position is "OFF". The difference in sensitivities for the alarm two levels allows the system operator to better adjust system sensitivity to the expected characteristics of the particular applications environment. As is evident from the above tables, the levels of the alarm two thresholds are preferably selected to be one and one half and twice the levels of the alarm one thresholds. The fifth position of the DIP switch can be used by the system operator to select and designate whether the corresponding unit is to function as a mater or as a slave.

A current to voltage converter 202 designated "I/V conv" converts the signal having a current representative of the intensity of the received infrared energy produced by the receiver 160 (FIG. 10) into a voltage having a level representative of the magnitude of the current. A third-order high-pass filter 204 is responsive to the voltage signal to attenuate any sixty-cycle noise that may have been picked up along the cable between the receiver head and the controller. The synchronous detector 196 repetitively samples the filtered signal having a voltage representative of the received energy preferably at the minimum amplitude peaks thereof under processor control as designated by line 200.

An integrator 208 is responsive to the magnitude of the sampled voltages and produces a DC voltage signal having a magnitude that is representative of the average of the sampled intensity of the received pulse energy. A buffer, filter, and level shifter 212 filters the DC signal, and the filtered signal is applied to a voltage controlled oscillator 212 designated "VCO". The voltage controlled oscillator 212 is coupled to an internal interrupt designated "I" of the processor 172.

During the read/receive counts window 136 of repetitive cycles 132, the processor is operative to store data representative of the magnitude of the DC signal level produced by the integrator 208 (FIG. 8), whose magnitude is proportional to the sum of the intensity of the three selectively sampled received pulses. The voltage controlled oscillator 212 is responsive to the magnitude of the DC signal and to a gain compensation signal to be described from the pulse width to current converter 198 to provide a pulse stream having a frequency only proportional to the level of the DC signal.

During the record/receive counts window 136, the processor is operative to enable the interrupt for a fixed duration and to count the number of pulses of the particular frequency produced by the voltage controlled oscillator 212 within the window 136. At the end of the window 136, the processor disables the interrupt and data corresponding to the count total is stored in the RAM 176.

The processor is then operative in the other tasks window 138 (FIG. 8) to compile data representative of a running average of the received signal energy over several cycles 132 (FIG. 8), and to compare the compiled data to the alarm one and to the alarm two thresholds. The processor 172 is operative to actuate the corresponding LED's 186, 188 when the compiled data drops below the corresponding alarm thresholds. A trouble threshold, corresponding to a beam-blocked condition, is preferably set in software at an 80% obstruction level. The processor is further operative to actuate the trouble LED 182 upon an 80% reduction in the compiled data for a predetermined time, preferably 60 seconds.

An automatic gain control circuit illustrated in dashed outline 214 and designated "AGC" includes the voltage controlled oscillator 212 and the pulse-width to current converter 198. The processor 172 is operative to set an internal software timer with a selectable time interval that determines the duration of the AGC window 140 (FIG. 8). The selectable time interval is selected by comparing the value of the running average of the received signal level to a predetermined value that corresponds to a nominal no-obscuration level, and by computing the percent change in the running average from the nominal level. The selectable interval is then either increased or decreased in accordance with the sense of the change.

At the beginning of the other tasks interval 138 (FIG. 8), the processor 172 is operative to controllably actuate the output of the latched parallel port 180 connected to the pulse width to current convertor 198 for a variable time interval defined by the internal software timer. At the beginning of the other tasks window 138 (FIG. 8), the pulse width to current convertor 198 is enabled. The variable length software timer disables the pulse width to current convertor 198 upon the running-out of the selected timer value. As appears below, the processor sets the internal timer with a new value preferably once per hour, and during each such hour, the processor uses the existing timer value to compensate the output of the voltage controlled oscillator 212 to provide both long-term and short-term fluctuating effects compensation.

A fast automatic gain control switch 216 is connected to an external interrupt of the processor 172. The processor is responsive to an operator pushing the fast AGC switch 216 to perform gain control once per second for 20 seconds useful for example during initialization and during subsequent trouble shooting.

Figure 11B:
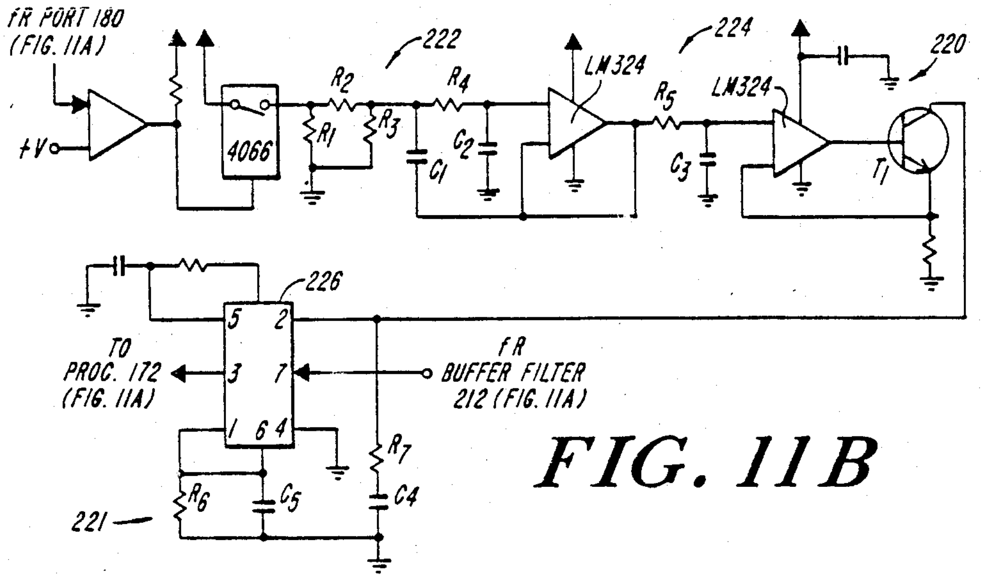
FIG. 11B is a schematic circuit diagram illustrating the automatic gain control circuit of the self-compensating, self-diagnostic, modular projected-beam smoke detector according to the present invention.

Referring now to FIG. 11B, generally designated at 220 is a circuit diagram illustrating the automatic gain control circuit 214 of FIG. 11A. A pulse width to current convertor generally designated 222 converts the variable length pulse width as produced by the software timer at the output of the latched parallel port 180 into a voltage having a magnitude that is proportional to the pulse width. The convertor includes a 4066 RCA analog switch, resistors R1–R4 and capacitors C1, C2 connected as a second order low pass filter. A voltage to current convertor generally designated 224 converts the voltage into a current signal having a magnitude proportional to the magnitude of the voltage signal. The convertor 224 includes a coupling resistor R5 and capacitor C3, an LM 324 operational amplifier, and a transistor T1.

The current signal produced by the convertor 224 is connected both to a reference current input pin designated "2" of a voltage controlled oscillator 226, preferably a National Semiconductor analog to digital convertor chip number LM331, and to pins designated "1" and "6" of the LM331 via a network generally designated 227 having resistors R6, R7 and capacitors C4, C5. The frequency output pin designated "3" of the LM331 is connected to an interrupt of the microprocessor 172. The output of the buffer and filter 210 (FIG. 11A) is connected to the comparator input pin designated "7" of the LM331. In this configuration, as will readily be appreciated by those skilled in the art, an increase in the pulse width produced by the software timer decreases the frequency out of the convertor at the pin designated "3", while a decrease thereof proportionately increases the output frequency, for a given DC level representative of the received signal intensity. The operation of the voltage controlled-oscillator of the automatic gain control circuit is expressed by the relation $f=k\ V_{in}/V_{agc}$, where $V_{agc}$ represents the voltage that is converted into a current by the stage 224, where $V_{in}$ represents the input voltage signal, and where k is a constant. Since the frequency produced thereby is the ratio of $V_{in}$ and $V_{agc}$, any changes in $V_{in}$ can be exactly compensated by a proportional change in $V_{agc}$. The pulse widths are selectable by the processor preferably to be between one thousand and six thousand microseconds. Since the frequency signal representative of the received infrared energy is gain compensated in hardware and always compared to the same operator-selectable first and second thresholds, the same discrimination performance is obtained irrespective of how small the magnitude of the actual received signal intensity becomes.

Figure 12:
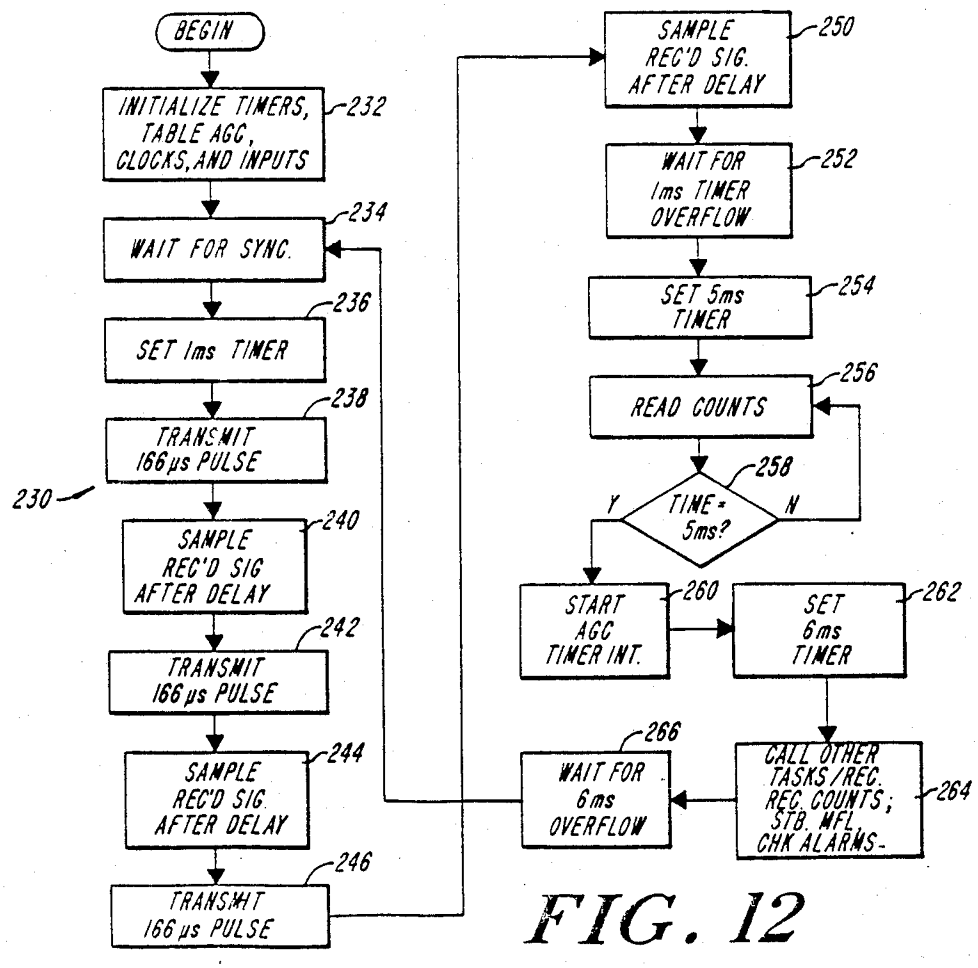
FIG. 12 is a flow chart illustrating the overall flow of processing of the self-compensating, self-diagnostic, modular projected-beam smoke detector according to the present invention.

Referring now to FIG. 12, generally designated at 230 is a flow chart illustrating the operation of the processor of the self-compensating, self-diagnostic, modular projected-beam smoke detector according to the present invention. As shown by a block 232, the processor is operative to initialize its window defining timers, its data table where the data representative of the intensity of the received energy is stored, the AGC timer, and system clocks, among other things, and waits if not the master for the sync signal from the master if two or more pairs of transceivers are used as illustrated by a block 234.

As shown by a block 236, the processor is then operative to set an internal one millisecond software timer. This timer defines the fixed interval of the transmit window of the successive cycles of detector operation.

As shown by a block 238, the processor is then operative to send a one hundred and sixty-six microsecond pulse via its multiplexed address and data bus to actuate the port of the latched parallel port connected to the current source 192 (FIG. 11A) to turn-on the transmitter LED 152 (FIG. 9).

As shown by a block 240, the processor is then operative to actuate the port of the latched parallel port connected to the synchronous detector and to sample the received signal representative of the intensity of the transmitted pulse after a preselected delay selected to sample the pulse at the peak of the received energy. The value of the sampled signal is stored in the integrator 208 (FIG. 11A).

The processor is then operative to transmit during the one millisecond transmit window the second one hundred and sixty-six microsecond pulse as illustrated by a block 242, and again to sample the received signal after a selected delay as shown by block 244. The corresponding value is accumulated in the integrator.

The processor is then operative to transmit the third one hundred and sixty-six microsecond pulse during the transmit window of successive cycles as shown by a block 246, and to likewise sample the received energy synchronously with the peak of the minimum energy as shown by a block 250.

As shown by a block 252 the processor then waits for the one millisecond timer to overflow.

As shown by a block 254, the processor is then operative to set a five millisecond internal software timer that defines the fixed duration read/receive counts window 136 (FIG. 8) of successive cycles of data collection.

The processor then enables the interrupt connected to the voltage to frequency convertor, and counts the frequency of the pulse train produced thereby as shown by a block 256.

As shown by a block 258, the processor is operative to count the pulse frequency for the five millisecond interval defined by the read/receive counts window.

As shown by a block 260, the processor is operative at the beginning of the other tasks window 138 (FIG. 8) to enable the automatic gain control function which is automatically terminated as an interrupt from the variable length AGC timer.

As shown by a block 262, the processor is then operative to set an internal six millisecond software timer that defines the interval of the other tasks window 138 (FIG. 8).

As shown by a block 264, the processor is then operative to call the other tasks subroutines that tally and average the received counts, that perform the automatic gain control, that accomplish periodic self-checking, that compare the average counts to the threshold alarms, that check for VCO saturation, and that indicate a clean condition.

As shown by a block 266, the processor then waits for an overflow of the six millisecond timer and processing is endlessly returned to the block 234.

Figure 13:
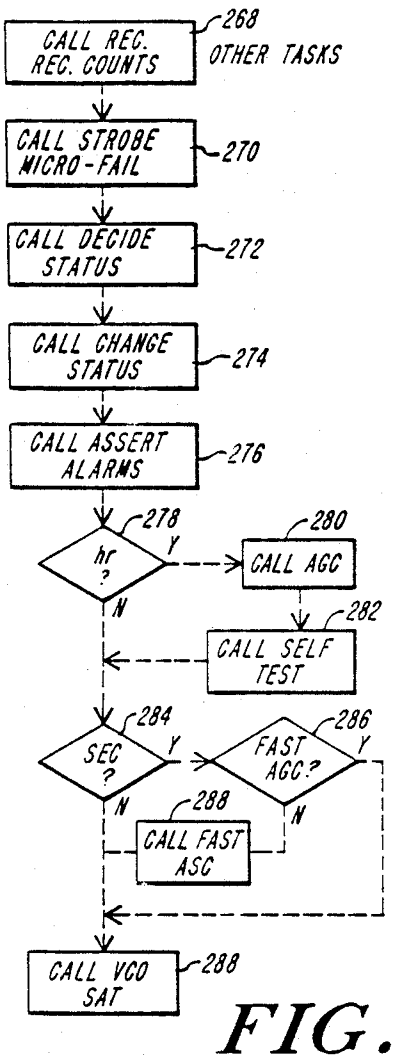
FIG. 13 is a flow chart illustrating the flow of processing of individual called subroutines of the self-compensating, self-diagnostic, modular projected-beam smoke detector according to the present invention.

Referring now to FIG. 13, generally designated at 267 is a flow chart illustrating the preferred sequence of subroutine call during the other tasks windows of successive cycles of operation.

As shown by a step 268, the processor is operative to call the record/receive counts subroutine. As appears below, this subroutine is operative to compile data representative of a running average of the magnitude of the received signal intensity over a predetermined number of basic cycles of operation.

As shown by a step 270, the processor is operative to call during the other tasks window a strobe-micro-fail subroutine. The strobe-micro-fail routine monitors the self-operation of the processor to provide a self-diagnostic signal indication of processor failure.

As illustrated by a step 272, the processor is operative to call a decide status subroutine. During the other tasks window of successive data collection cycles, the processor determines by this subroutine whether the state of the detector is such as to warrant an alarm one, an alarm two, a trouble, a clean, and/or a micro-fail signal indication during self-test.

As shown by a step 274, the processor is then operative to call a change states subroutine to determine whether a change of state in the output signal indications from its prior state to a new state is called for.

As shown by a step 276, the processor is then operative to call an assert alarms subroutine. The assert alarms subroutine enables the processor to provide external alarm and self-diagnostic indications.

As shown by a block 278, the processor is operative every hour to call an automatic gain control subroutine illustrated by a step 280. The automatic gain control subroutine 280 enables the processor to compensate its decision logic to adapt actual conditions to design parameters for long-term film-build-up and for comparatively short-term atmospheric fluctuations in the region to be protected.

As shown by a step 282, the processor is operative every hour to call a self-test subroutine. The self-test subroutine allows the processor to provide a self-diagnostic signal indication of whether or not the system is operating in its intended manner.

As shown by a block 284, the processor is operative once per second to determine whether the fast automatic gain control switch has been selected by the operator as shown by a block 286. If the fast AGC switch has been selected, the processor is operative to call a fast automatic gain control subroutine as illustrated by a step 288. The fast automatic gain control subroutine 288 allows the processor to perform automatic gain control rapidly in response to a request to do so by a system installer and/or by a subsequent system user such as during system maintenance and/or troubleshooting.

As shown by a step 288, the processor is operative during the other tasks window to call a voltage controlled oscillator saturation subroutine. The voltage controlled oscillator saturation subroutine enables the processor to determine whether the voltage to frequency convertor should be reset in operation to accomodate quick changes in the quality of the beam.

Figure 14:
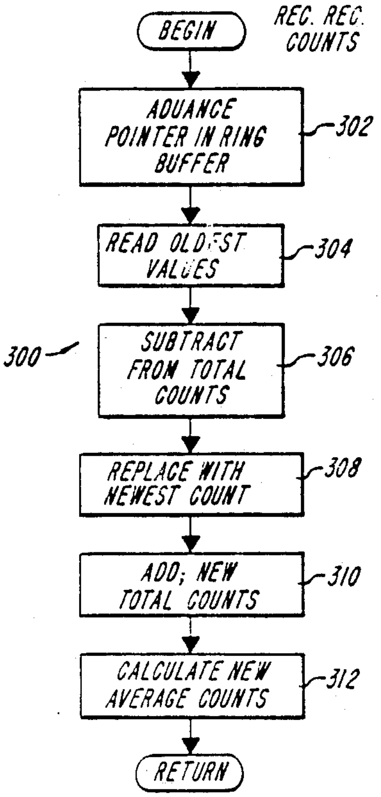
FIG. 14 is a flow chart illustrating a "record received counts" subroutine of FIG. 13.

Referring now to FIG. 14, generally designated at 300 is a flow chart illustrating the record/receive counts subroutine. As shown by a block 302, the processor is operative to advance a pointer of a software defined ring buffer, that in preferred embodiment includes eight circulating RAM address locations. At any given time, the processor is operative to maintain in RAM a total counts variable representative of the sum of the counts in each of the eight address locations and to maintain an average counts variable that represents the average of the total counts variable over the number of address locations. The data corresponding to the intensity of the received energy is stored in a corresponding address location successively for eight cycles and thereafter on a first in last out basis.

As shown by a block 304, the processor is first operative to read the oldest value in the ring buffer.

As shown by a block 306, the processor is then operative to subtract the oldest value from the total counts variable.

As shown by a block 308, the processor is then operative to write the data collected for the most recent cycle into the address location of the deleted value.

As shown by a block 310, the processor is then operative to add the newest count data to the prior data already existing in the other seven locations of the ring buffer to update the total counts variable.

As shown by a block 312, the processor is then operative to calculate a new average counts variable. Processing then exits the record/receive counts subroutine.

Figure 15:
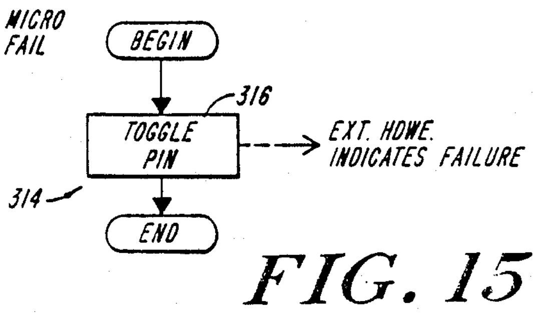
FIG. 15 is a flow chart illustrating a "micro-fail" subroutine of FIG. 13.

Referring now to FIG. 15, generally designated at 314 is a flow chart illustrating the micro-fail subroutine. As illustrated by a block 316, the processor is operative to toggle the watch-dog timer port of the latched parallel port 180 (FIG. 11A). If for any reason, as for example a microprocessor internal failure, the external port is not toggled, the watch-dog timer 190 (FIG. 11A) is responsive to a failure to toggle the pin and operative to illuminate the micro-fail LED 191 (FIG. 11A). After toggling the pin, processing exits the micro-fail subroutine.

Figure 16:
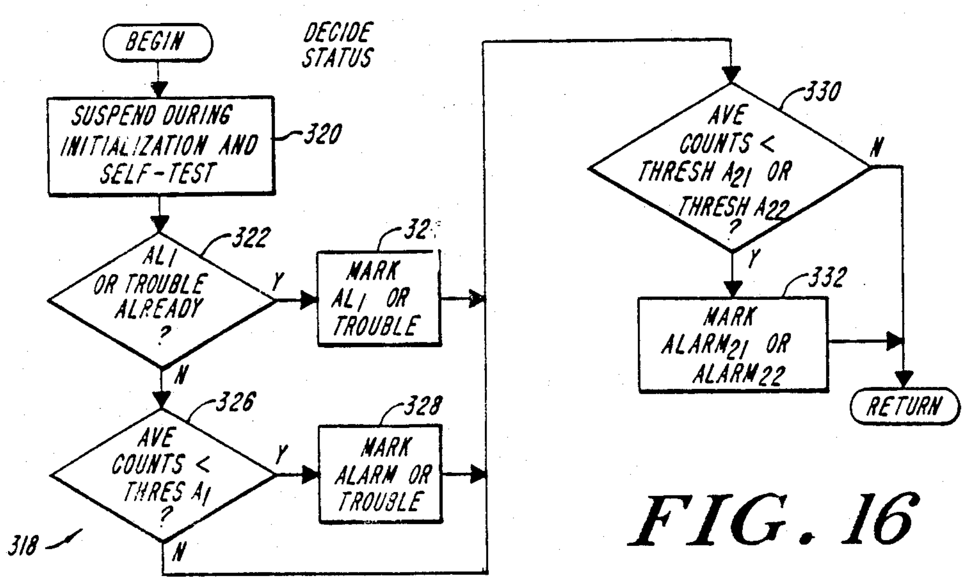
FIG. 16 is a flow chart illustrating a "decide status" subroutine of FIG. 13.

Referring now to FIG. 16, generally designated at 318 is a flow chart illustrating the flow of processing of the decide status subroutine. As illustrated by a block 320, the processor is operative to suspend the decide status subroutine during initialization and self-test.

As shown by a block 322, if an alarm one or an alarm two or a trouble indication has already been indicated, the processor is then operative to keep it marked as shown by a block 324.

If an alarm or trouble situation does not already exist, the processor compares the value of the current average counts variable to the particular one of the plural operator-selectable alarm one thresholds to determine whether it is below the threshold, and compares it to the trouble threshold to determine whether it is below the trouble threshold as shown by a block 326. If the average counts is below either the alarm one threshold or the trouble threshold, the processor is operative to mark an alarm one situation or a trouble situation as shown by a block 328.

As shown by a block 330, the processor is then operative to compare the value of the average counts data variable to the particular one of the operator-selectable alarm two thresholds for either high or low sensitivity to determine whether it is below the corresponding threshold.

As shown by a block 332, if the average counts data variable is below the corresponding threshold, the processor is operative to mark either the high-sensitivity or the low-sensitivity alarm two state variable. Processing is then returned.

Figure 17:
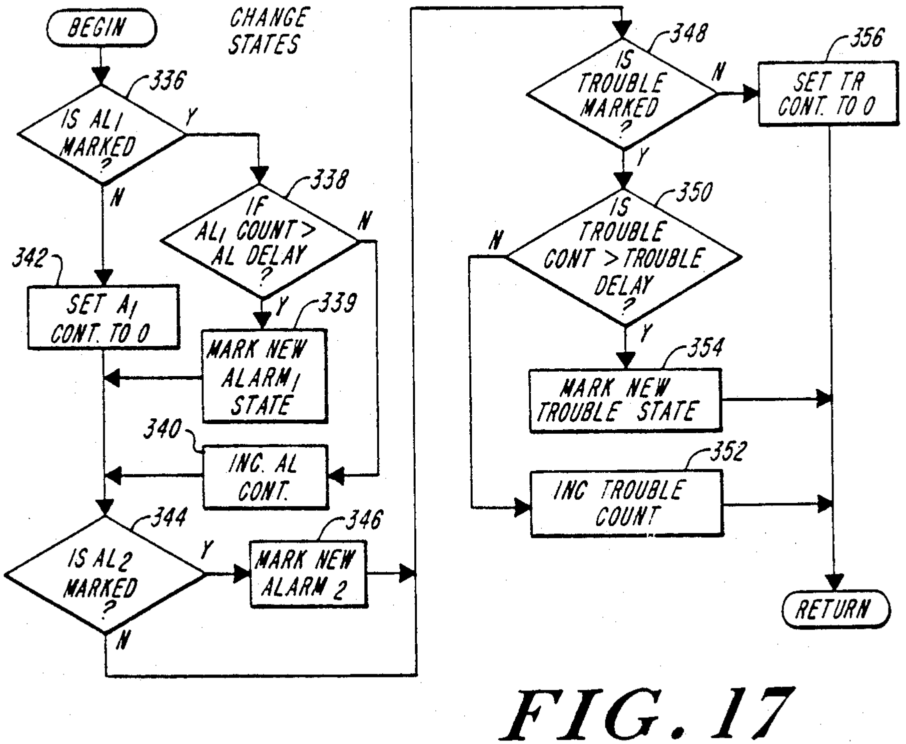
FIG. 17 is a flow chart illustrating a "change status" subroutine of FIG. 13.

Referring now to FIG. 17, generally designated at 334 is a flow chart illustrating the change-states subroutine. As shown by a block 336, the processor is operative to determine if an alarm situation exists for the alarm one threshold.

As shown by a block 338, if the alarm one state variable has been marked,d the processor is operative to determine whether an internal alarm one software counter exceeds a predetermined alarm delay. The alarm delay allows the processor to wait a predetermined interval before signalling an alarm to eliminate a spurious detection.

As shown by a block 339, if the alarm one counter exceeds the alarm delay the processor is operative to mark a new alarm one state variable.

As shown by a block 340, if the alarm one counter does not exceed the alarm delay, the processor is operative to increment the alarm one counter and processing branches to a block 344.

If the alarm one state variable is not marked, the processor is operative to set the alarm one counter to zero as illustrated by a block 342.

As shown by a block 344, the processor is then operative to determine whether the alarm two state variable has been marked, and if it has, the processor is operative to mark a new alarm two state variable as illustrated by a block 346.

The processor is then operative as shown by a block 348 to determine whether the trouble state variable has been marked. If the trouble state variable has been marked as shown by a block 350, the processor is operative to determine whether an internal software trouble counter is greater than a predetermined trouble delay. As shown by a block 352, if it is not greater, the trouble counter is incremented and then processing returns.

As shown by a block 354, if the trouble counter is greater than the trouble delay, the processor is operative to mark a new trouble state variable.

As shown by a block 356, if trouble has not been marked, the processor is operative to set the trouble counter to zero and processing is returned.

Figure 18:
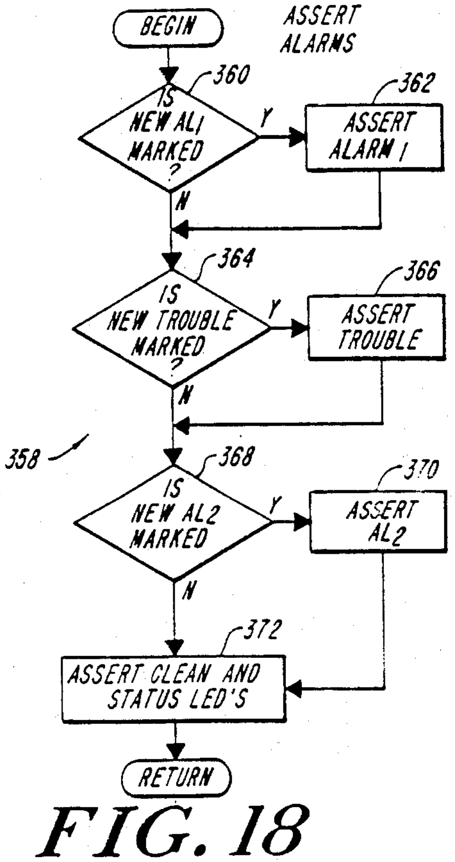
FIG. 18 is a flow chart illustrating a "assert alarms" subroutine of FIG. 13.

Referring now to FIG. 18, generally designated at 358 is a flow chart illustrating the processing sequence of the assert alarms subroutine. As shown by a block 360, the processor is operative to determine if the new alarm one state variable has been marked, and to assert it if it has, as shown by a block 362.

As shown by a block 364, the processor is then operative to determine if the new trouble state variable has been marked, and if it has, to assert it as shown by a block 366.

As shown by a block 368, the processor is then operative to determine if the new alarm two state variable has been marked, and if it has to assert it as shown by a block 370.

As shown by a block 372, the processor is then operative to assert the clean and the other status LED's, where appropriate, and processing is returned.

Figure 19:
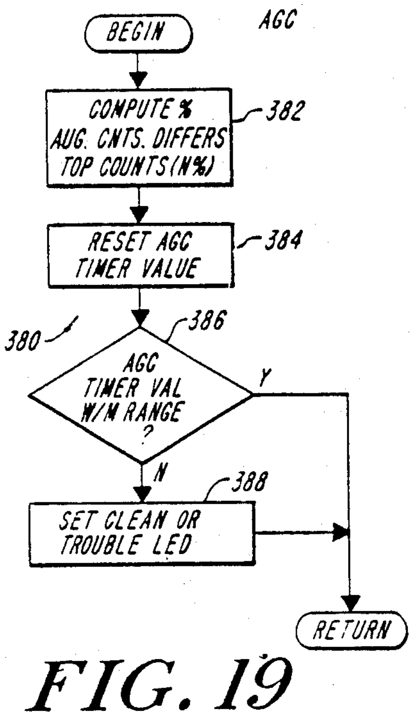
FIG. 19 is a flow chart illustrating a "gain control" subroutine of FIG. 13.

Referring now to FIG. 19, generally designated at 380 is a flow chart illustrating the processing steps of the automatic gain control subroutine.

As shown by a block 382, the processor is operative to compute the percentage difference (N) between the current value of the average counts variable from the value of a top counts data variable stored in system memory. The top counts data variable has a preselected value selected to be equal to that count value that would be received in the absence of any obscuration. The gain of the variable gain amplifier 166 (FIG. 10) is adjusted during initialization to roughly set this value, and the system installer then uses the first AGC switch to finely adjust the system to this value. The top counts data variable is fixed in normal operation and stored in RAM.

As shown by a block 384, the processor is then operative to reset the automatic gain control variable length software timer by an amount that preferably corresponds to fifty percent of the present change (N) determined in the step 382 and in a sense that corresponds to the sense of the change.

As shown by a block 386, the processor is the operative to determine whether the length of the selectable length automatic gain control timer value is within its design range.

As shown by a block 388, if the value is not within the design range, the processor marks the clean and trouble LED state variable and processing is returned.

Figure 20:
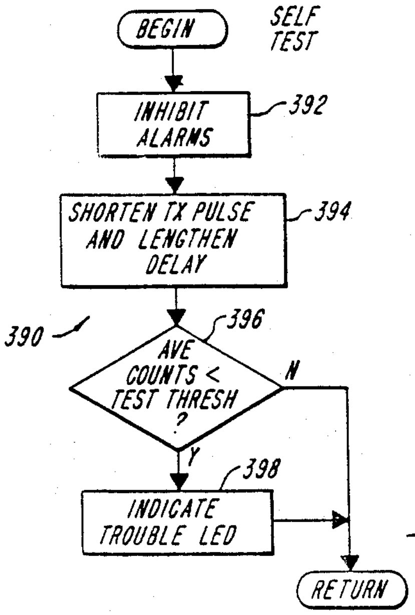
FIG. 20 is a flow chart illustrating a "self-test" subroutine of FIG. 13.

Referring now to FIG. 20, generally designated at 390 is a flow chart illustrating the processing steps of the self-test subroutine. As illustrated by a block 392, the processor is operative to inhibit the external alarms to prevent false indications of an actual alarm or trouble situation.

As shown by a block 394, the processor is then operative to transmit shortened pulses and to sample the received energy after correspondingly lengthened delays. The shortened pulses result in decreased received energy intensity that simulate an actual alarm situation.

As shown by a block 396, the processor is then operative to determine whether the value of the self-test counts variable is less than the lowered test thresholds provided therefor in RAM.

As shown by a block 398, if the self-test counts are now higher than the lowered test thresholds, the processor is operative to indicate a trouble condition as a self-test failure. Processing is then returned.

Figure 21:
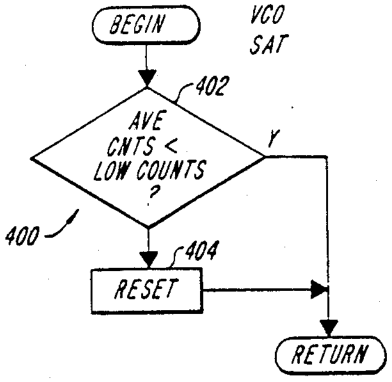
FIG. 21 is a flow chart illustrating a "voltage controlled oscillator saturation" subroutine of FIG. 13.

Referring now to FIG. 21, generally designated at 400 is a flow chart illustrating the flow of processing of the voltage controlled oscillator saturation determination subroutine. As shown by a block 402, the processor is operative to determine whether the value of the current average counts data variable is less than a predetermined low-counts threshold stored in system memory, when the average counts data variable is characterized by a significant change in its value. The change would occur, for example, if for any reason there occurs a quick reduction in the obscuration level along the beam path. If the average counts value is less than the low threshold, the processor is operative to reset the VCO as shown by a block 404 and processing is returned.

It will be appreciated that many modifications of the presently disclosed invention will become apparent to those skilled in the art without departing from the scope of the appended claims.

What is claimed is:

1. A projected-beam smoke detector substantially free from undesirable electrical interference effects in a protected region, comprising:

an infrared energy transmitter and a transmitted infrared energy receiver spaced from said infrared energy transmitter defining therebetween an optical axis for infrared energy transmitted through the protected region wherein are present potentially interfering electrical effects having a spectrum including a significant component at a known frequency;

controller means coupled to said infrared energy transmitter for defining a transmit window and a nontransmit window for said projected-beam smoke detector, said controller means being operative to repetitively pulse said infrared energy during each transmit window to produce a pulsed transmitter signal of bursts of pulses separated by a predetermined non-zero time interval corresponding to said nontransmit window, each of said bursts having plural pulses having a preselected period selected to define a pulse frequency spectrally offset from the known frequency of the potentially interfering electrical effects, and wherein said controller means is coupled to said transmitted infrared energy receiver for controlling detection of said bursts of pulses of said pulse transmitter signal by said transmitted infrared energy receiver;

means coupled to said transmitted infrared energy receiver including band pass filter means centered about said spectrally offset pulse frequency of said bursts of pulses for filtering the known frequency of the potentially interfering electrical effects from said bursts of pulses of said pulsed transmitter signal detected by said transmitted infrared energy receiver and providing a filtered signal corresponding to said bursts of pulses of said pulse transmitter signal;

synchronous detector means means coupled to said band pass filter means for synchronously sampling said filtered signal and for providing sampled voltages corresponding to said filtered signal;

means coupled to said synchronous detector means and responsive to said sampled voltages for providing data corresponding to the sum of the intensity of said plural pulses of each burst of said pulse transmitter signal; and means coupled to said data providing means for providing at least one alarm indication of smoke in the protected region whenever said data meets a predetermined criteria.

2. The projected-beam smoke detector of claim 1 wherein said infrared energy transmitter includes an infrared emitting diode, and wherein said controller means includes current source means coupled to said infrared emitting diode for repetitively pulsing said infrared emitting diode.

3. The projected-beam smoke detector of claim 1 wherein said transmitted infrared energy receiver includes infrared responsive means for producing an analog signal corresponding to the intensity of said pulse transmitter signal, and wherein said synchronous detector means includes sample and hold means operative for sampling said filtered signal produced by said infrared responsive means at time corresponding to a maximum energy condition of the pulse transmitted signal.

4. The projected-beam smoke detector of claim 3 wherein said data providing means includes integrator means responsive to said sampled voltages for producing a DC voltage signal corresponding to an average of the intensity of said plural pulses of each burst of said pulse transmitter signal and voltage controlled oscillator means responsive to said DC voltage signal for providing a pulse train having a frequency corresponding to the magnitude of said DC voltage signal.

5. The projected-beam smoke detector of claim 1 wherein said controller means includes memory means for defining said predetermined criteria.

* * * * *